United States Patent
Akiyama et al.

(10) Patent No.: US 6,724,919 B1
(45) Date of Patent: Apr. 20, 2004

(54) METHOD OF PERSONAL VERIFICATION FOR COMPUTER SYSTEM, COMPUTER SYSTEM, AND RECORDING MEDIUM

(75) Inventors: Kazuhiro Akiyama, Hachioji (JP); Shunichi Mizuhiki, Sayama (JP); Yoshihiro Katayama, Yono (JP); Takayuki Nakashima, Ome (JP); Naoya Yamashita, Ome (JP); Yasuyo Jitsuishi, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 585 days.

(21) Appl. No.: 09/597,263

(22) Filed: Jun. 20, 2000

(30) Foreign Application Priority Data

Jun. 25, 1999 (JP) .......................... 11-180596

(51) Int. Cl.[7] .................................. G06K 9/00
(52) U.S. Cl. ................. 382/118; 382/209; 382/115; 340/5.52; 713/186
(58) Field of Search ................. 382/110, 115, 382/117, 118, 144, 149, 151, 159, 171, 172, 190, 195, 209, 216, 217, 218, 219, 220, 224, 278, 282, 284, 287, 291, 294, 295, 303, 305; 358/537, 538, 452; 340/3.25, 5.27, 5.52, 5.53, 5.54; 713/186; 902/3, 4

(56) References Cited

U.S. PATENT DOCUMENTS

| | | | | |
|---|---|---|---|---|
| 4,975,960 A | * | 12/1990 | Petajan | 704/251 |
| 4,975,969 A | * | 12/1990 | Tal | 382/116 |
| 5,012,522 A | * | 4/1991 | Lambert | 382/118 |
| 5,450,504 A | * | 9/1995 | Calia | 382/118 |
| 5,550,928 A | * | 8/1996 | Lu et al. | 382/116 |
| 5,553,155 A | * | 9/1996 | Kuhns et al. | 382/115 |
| 5,802,208 A | * | 9/1998 | Podilchuk et al. | 382/224 |
| 5,880,783 A | * | 3/1999 | Ma | 348/373 |
| 6,038,333 A | * | 3/2000 | Wang | 382/118 |
| 6,108,437 A | * | 8/2000 | Lin | 382/118 |
| 6,377,995 B2 | * | 4/2002 | Agraharam et al. | 709/231 |

FOREIGN PATENT DOCUMENTS

| | | |
|---|---|---|
| JP | 3-90968 | 4/1991 |
| JP | 5-20367 | 1/1993 |
| JP | 5-334374 | 12/1993 |
| JP | 9-251534 | 9/1997 |

OTHER PUBLICATIONS

Osamu Yamaguchi et al., "Face Recognition System Using Temporal Image Sequence", Institute of Electronics, Information and Communication Engineers, Technical Report, PRMU 97–48~54, pp. 17–24, (1997).

* cited by examiner

*Primary Examiner*—Timothy M. Johnson
*Assistant Examiner*—Yosef Kassa
(74) *Attorney, Agent, or Firm*—Finnegan, Henderson, Farabow, Garrett & Dunner, L.L.P.

(57) ABSTRACT

According to present invention, there is provide a method of verification for a computer system, the method comprising the steps of acquiring a face image of a user at any time of a user operation, verifying whether the acquired face image coincides with any one of pre-registered face images, and executing a preset process where the acquired face image coincides with the any one of the pre-registered face images.

22 Claims, 13 Drawing Sheets

| REGISTRANT ID VERIFIED IMMEDIATELY BEFORE ||
|---|---|
| ID1 | PERSONAL DATABASE ADDRESS OF USER ID1 |
| ID2 | PERSONAL DATABASE ADDRESS OF USER ID2 |
| ID3 | PERSONAL DATABASE ADDRESS OF USER ID3 |
| ID4 | |

| | | EX-FLG |
|---|---|---|
| text | HELLO, Mr.○○ TARO | on |
| sound | 0 | off |
| Ap.1 | 0 | off |

|   |   | EX-FLG |
|---|---|---|
| text | HELLO, Ms.MARI ODA | on |
| sound | abc.wav | off |
| Apl.1 | mail.exe | off |
| image | image1 | off |

← - - - - ADD "IMAGE"

METHOD OF PERSONAL VERIFICATION FOR COMPUTER SYSTEM, COMPUTER SYSTEM, AND RECORDING MEDIUM

CROSS-REFERENCE TO RELATED APPLICATIONS

This application is based upon and claims the benefit of priority from the prior Japanese Patent Application No. 11-180596, filed Jun. 25, 1999, the entire contents of which are incorporated herein by reference.

BACKGROUND OF THE INVENTION

The present invention relates to a personal verification method for a computer system, a computer system having an image-pickup camera, and a machine-readable recording medium applied to a computer system having an image-pickup camera.

There is a personal computer having, as an extension function, a camera image processing function wherein an image is picked up by means of an image-pickup camera provided on the personal computer and the image is incorporated into, e.g. a mail.

In this type of personal computer, when a user of the personal computer is identified, personal verification means using password registration has conventionally been used. In addition, when the user activates a given application program, the user is required to perform operations of selecting a desired application program and activating it, following the activation of the system.

As has been stated above, in the conventional computer system, when the user of the computer system is identified, password registration is required. In addition, when the user activates a given application program, the user is required to perform operations of selecting a desired application program and activating it, following the activation of the system. Under the circumstances, there are problems in the operability of the computer system.

BRIEF SUMMARY OF THE INVENTION

The present invention has been made in consideration of the above-described circumstances, and an object of the invention is to provide a personal verification method for a computer system, a computer system having an image-pickup camera, and a machine-readable recording medium applied to a computer system having an image-pickup camera, whereby an operational load on a user can be lightened and a security function with high reliability can be achieved.

Another object of the invention is to provide a personal verification method for a computer system, a computer system having an image-pickup camera, and a machine-readable recording medium applied to a computer system having an image-pickup camera, thereby achieving a function of performing personal verification using a face image acquired by an image-pick camera and automatically activating a given application program or an individually set program, as well as a highly reliable security function and a high operability.

According to the present invention, the function of performing a personal verification procedure using a face image acquired by the image-pick camera and then automatically activating a given application program or an individually set program can be achieved. A personal verification technique using face images, which is applicable to the present invention, is, for example, "PERSONAL VERIFICATION APPARATUS AND PERSONAL METHOD" disclosed in Japanese Patent Application No. 8-61463 fled by the same applicant as the present application. According to this personal verification technique using face images, it is possible to perform with high precision the personal verification by stably extracting features of the eyes, nose, etc. from an input image without influence of luminance variation, etc.

The present invention is characterized by the above-described function of automatically executing a given process, such as activation of a predetermined application or activation of an individually set application, which is triggered by a personal verification result acquired by the personal verification technique using face images.

In order to achieve the above objects, according to a first aspect of the present invention, there is provided a method of verification for a computer system, the method comprising the steps of:

acquiring a face image of a user at a time of a user operation;

verifying whether the acquired face image coincides with any one of pre-registered face images; and executing a preset process where the acquired face image coincides with the any one of the pre-registered face images.

According to a second aspect of the invention, there is provided a computer system comprising:

means for acquiring a face image of a user;

means for processing verification of the user by extracting features of the acquired face image; and means for executing a feature of a preset process where the verification of the user is confirmed by the processing means.

According to a third aspect of the invention, there is provided a computer-readable information recording medium comprising:

means for acquiring a face image of a user at a time of a user operation;

means for verifying whether the acquired face image coincides with any one of pre-registered face images; and means for executing a preset process where the acquired face image coincides with the any one of the pre-registered face images.

With the above-described processing function, the operational load on the user can be lightened and a highly reliable security function achieved. In addition, according to the present invention, the function of performing a personal verification procedure using a face image acquired by the image-pick camera and then automatically activating a given application program or an individually set program can be achieved. Thereby, a system with a highly reliable security function and high operability can be provided.

Specifically, information definitions of, e.g. applications to be executed following the personal verification procedure can be preset and managed on a user-by-user basis. Thus, where many users are registered, a user in front of the camera can be verified and a process for the user can be set. Accordingly, the user is not required to find and set his/her own information, and the operability is greatly enhanced.

A notice of a personal verification result can be issued by means of a desired text message, speech message, sound, etc. Thus, where personal verification is effected, not only a message can be displayed on the screen, but also a notice of a verification result can be issued with different messages associated with respective users. Thereby, the user can be exactly notified of the verification result.

Moreover, since a desired application can be activated when personal verification is effected, there is no need to alter setting even where the use changes, and the operability is greatly enhanced. Besides, following personal verification, a given computer graphics image prepared in advance can be synthesized into an input image. Thus, where personal verification is effected, not only a message can be displayed on the screen, but also a notice of a verification result can be issued with different messages associated with respective users. Thereby, the user can be exactly notified of the verification result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a view for describing the operation of the embodiment, showing an example of the state in a registrant management database (DB2);

FIG. 10 is a view for describing the operation of the embodiment, showing an example of the state in a personal database (DB3);

DETAILED DESCRIPTION OF THE INVENTION

Preferred embodiments of the present invention will now be described with reference to the accompanying drawings.

Figure 1:
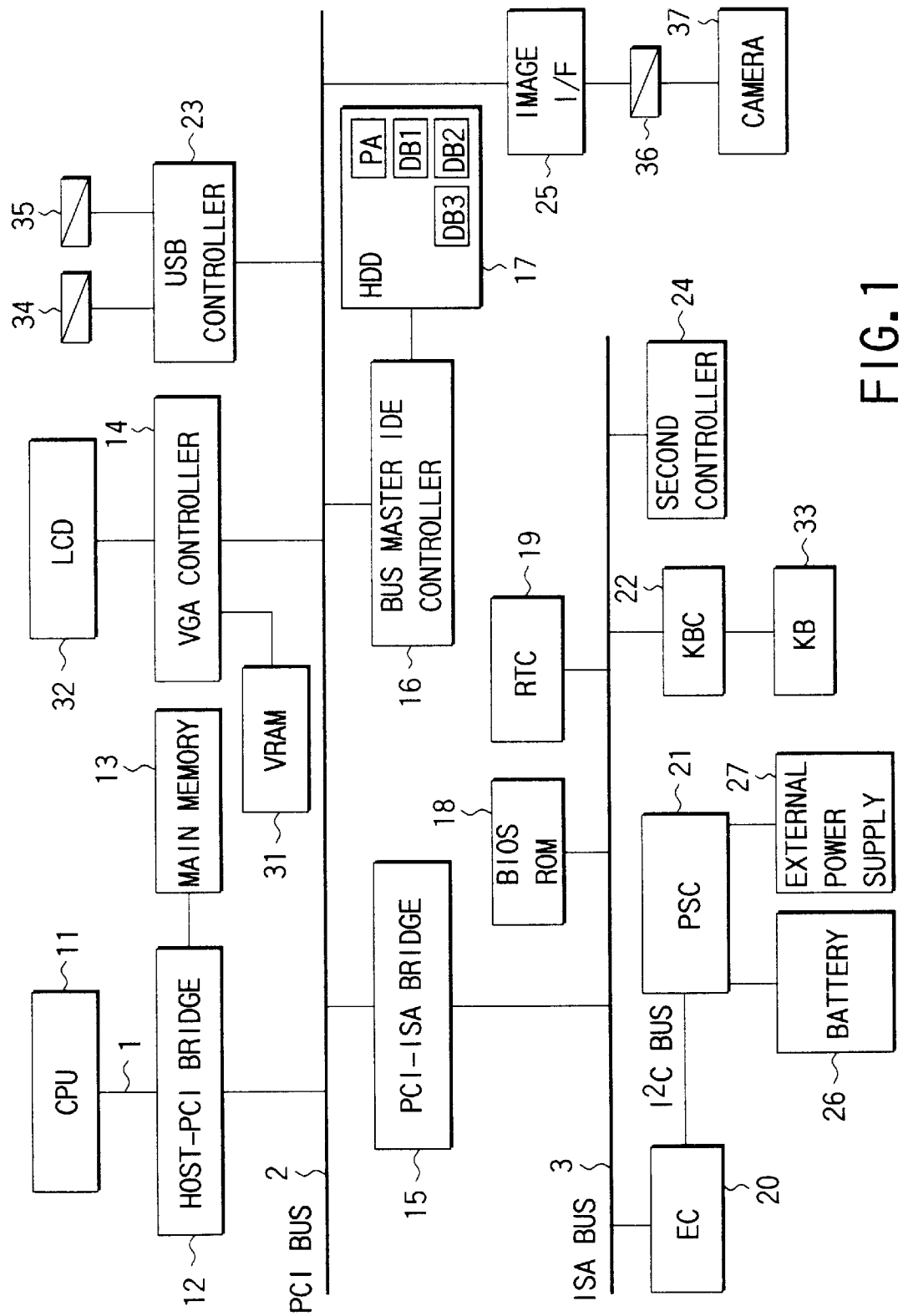
FIG. 1 is a block diagram showing an example of a system structure of a personal computer according to an embodiment of the present invention.

FIG. 1 is a block diagram showing an example of the construction of a personal computer system according to an embodiment of the present invention.

This computer system is a portable personal computer of, e.g. a sub-note type or a pocket type. The computer system comprises a computer main body and an LCD panel unit openably attached to the computer main body. The computer system includes a built-in battery. The computer system can be operated by power from the built-in battery. The computer system may be supplied with power from an external power supply such as an AC commercial power supply via an AC adapter. When power is supplied from the external power supply, the power from the external power supply is used as power for operating the computer system. In this case, the built-in battery is automatically charged with power from the external power supply. In case the AC adapter is removed or a circuit breaker of an AC commercial power supply is opened, power from the built-in battery serves to activate the computer.

In the present embodiment, an image-pickup camera 37 for imaging the face of an operator (user) is provided on a hinge box of the computer main body at which the LCD panel unit is rotatably supported. In the present embodiment, the camera is attached to the computer main body but, needless to say, a camera may be externally connected to the computer main body.

The computer main body is equipped with a hard disk drive (HDD) 17 having an IDE interface. The HDD 17 is used as a secondary memory of the computer system. The HDD 17 stores various information files as well as various applications, for example, "Audio", "Voice Recorder", "Mail Reader", "Internet Startup", "Video Camera", "Electronic Camera."

Figure 7:
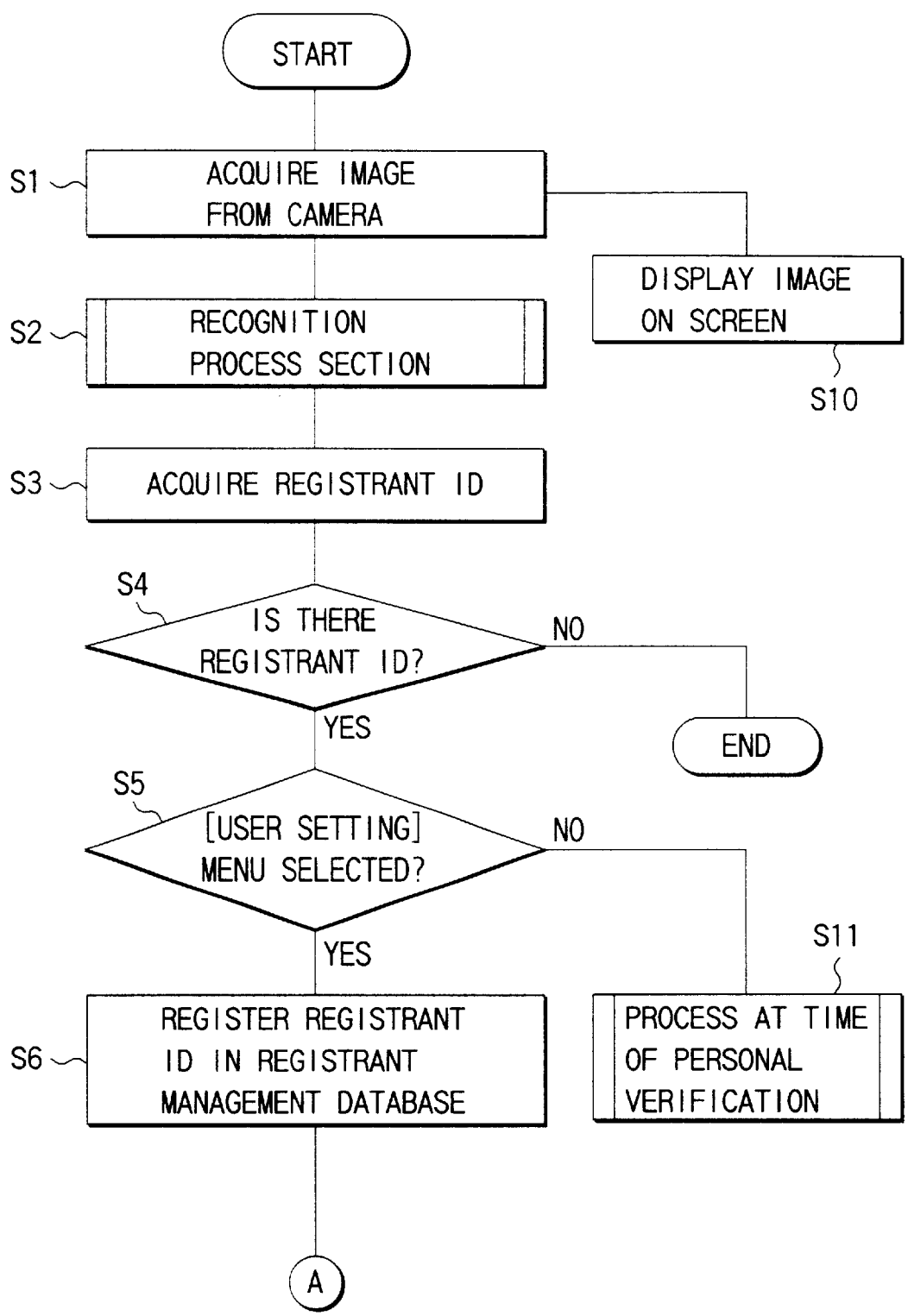
FIG. 7 is a flow chart illustrating a personal verification process procedure according to the personal verification process program (PA) in the above embodiment.
Figure 11:
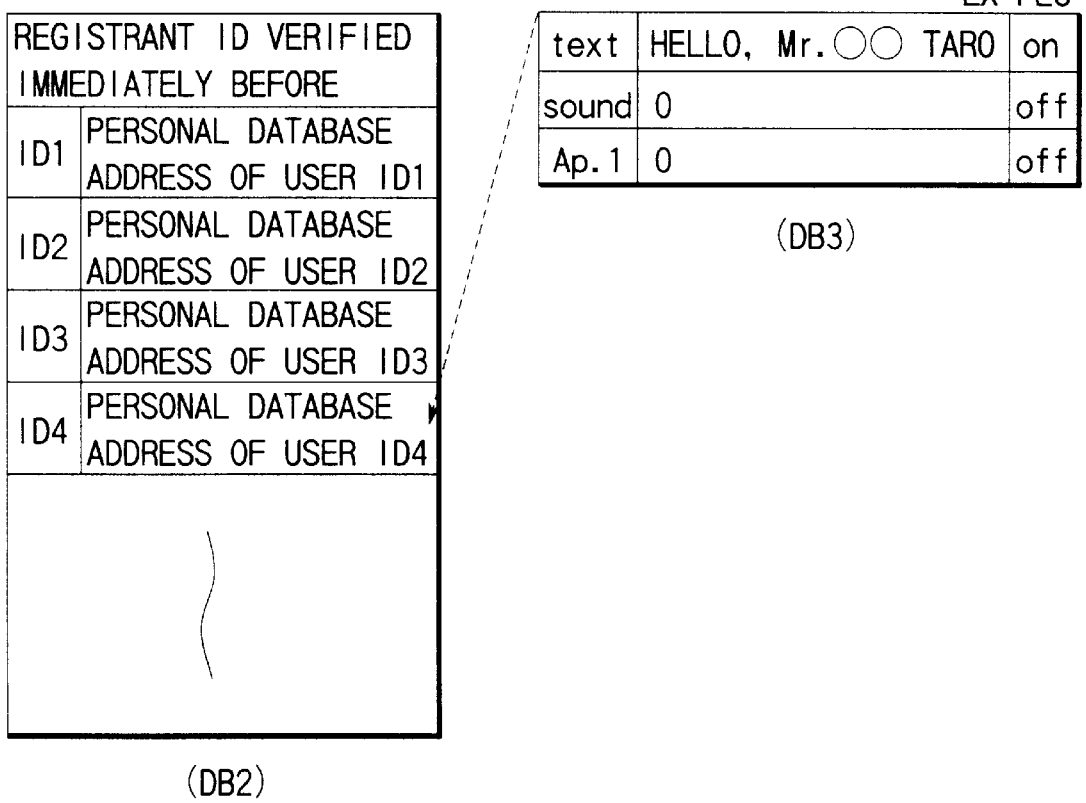
FIG. 11 is a view for describing the operation of the embodiment, showing examples of the states in the registrant management database (DB2) and personal database (DB3)

In this embodiment, the HDD 17 stores personal verification process programs (PA) for realizing process functions as illustrated in FIGS. 2, 7, 8, 12 and 13. In addition, the HDD 17 stores a dictionary image file (DB1) storing face images, a registrant management database (DB2) as shown in FIGS. 3, 9 and 11, and an individual database (DB3) as shown in FIGS. 3, 10 and 11 which is managed by the registrant management database (DB2). As regards the personal verification process programs (PA), the process function of a recognition process section to be executed in step S2 in FIG. 7 is realized by using "PERSONAL VERIFICATION APPARATUS AND PERSONAL VERIFICATION METHOD" disclosed in Japanese Patent Application No.

Figure 5:
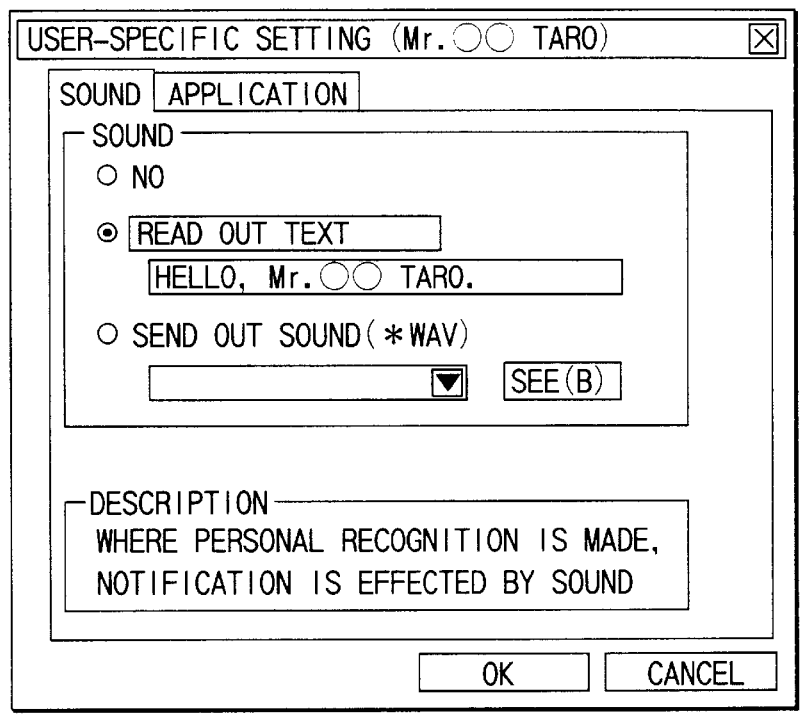
FIG. 5 is a view for illustrating an operation of the embodiment, showing an example of the structure of a screen image for setting a process when personal verification has been effected.
Figure 6:
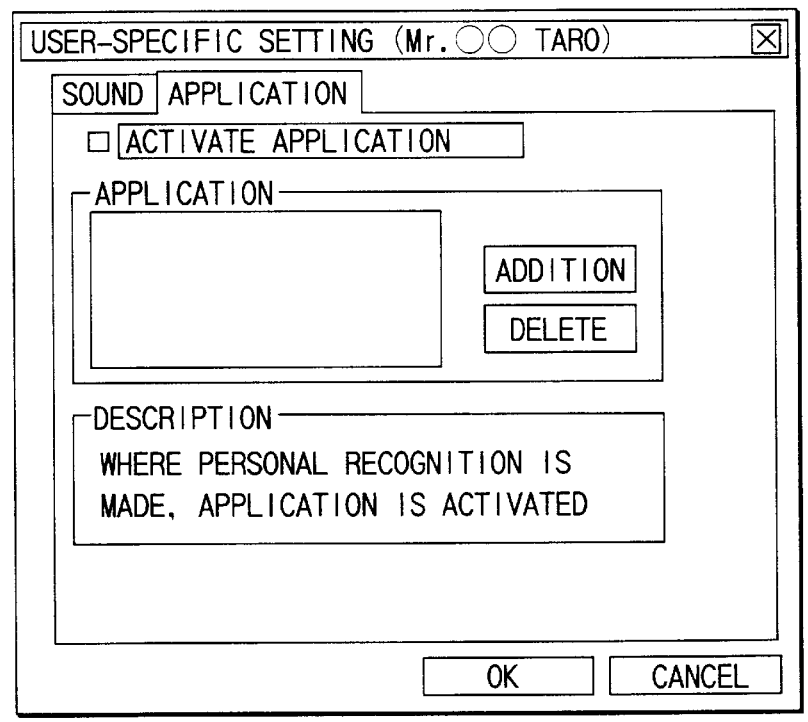
FIG. 6 is a view for illustrating an operation of the embodiment, showing an example of the structure of a screen image for setting a process when personal verification has been effected.
Figures 14, 15:
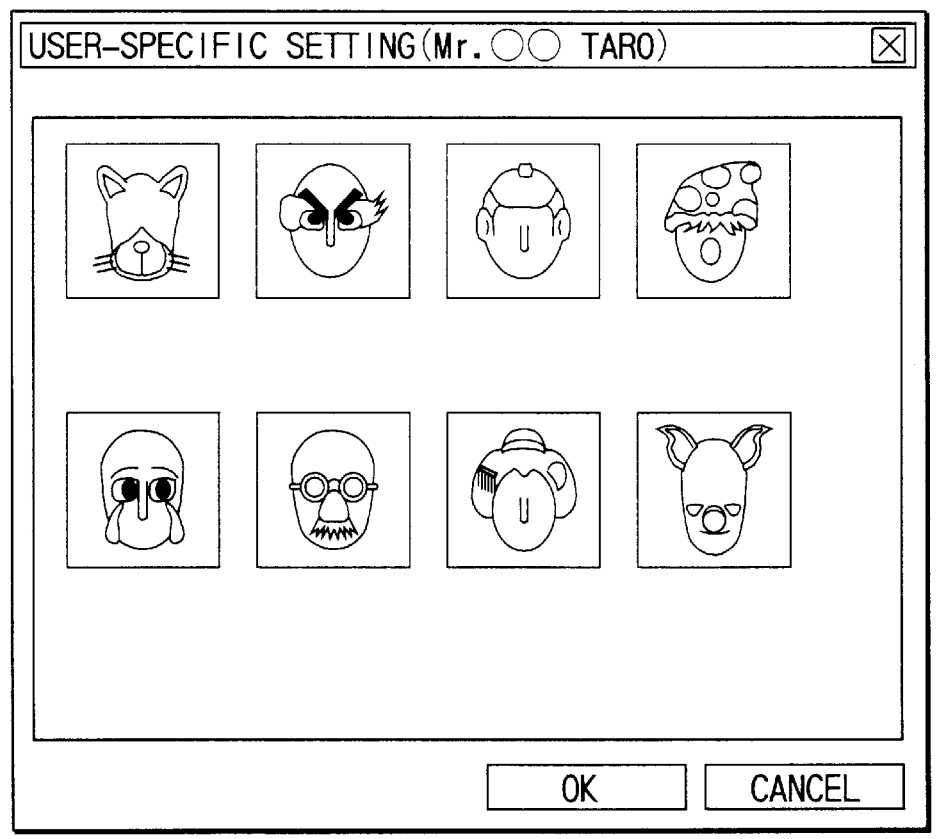
FIG. 14 shows an example of the structure of a registrant management database (DB2) in another embodiment of the invention.
FIG. 15 shows an example of the structure of a synthesis image selection screen in this another embodiment.
Figure 16:
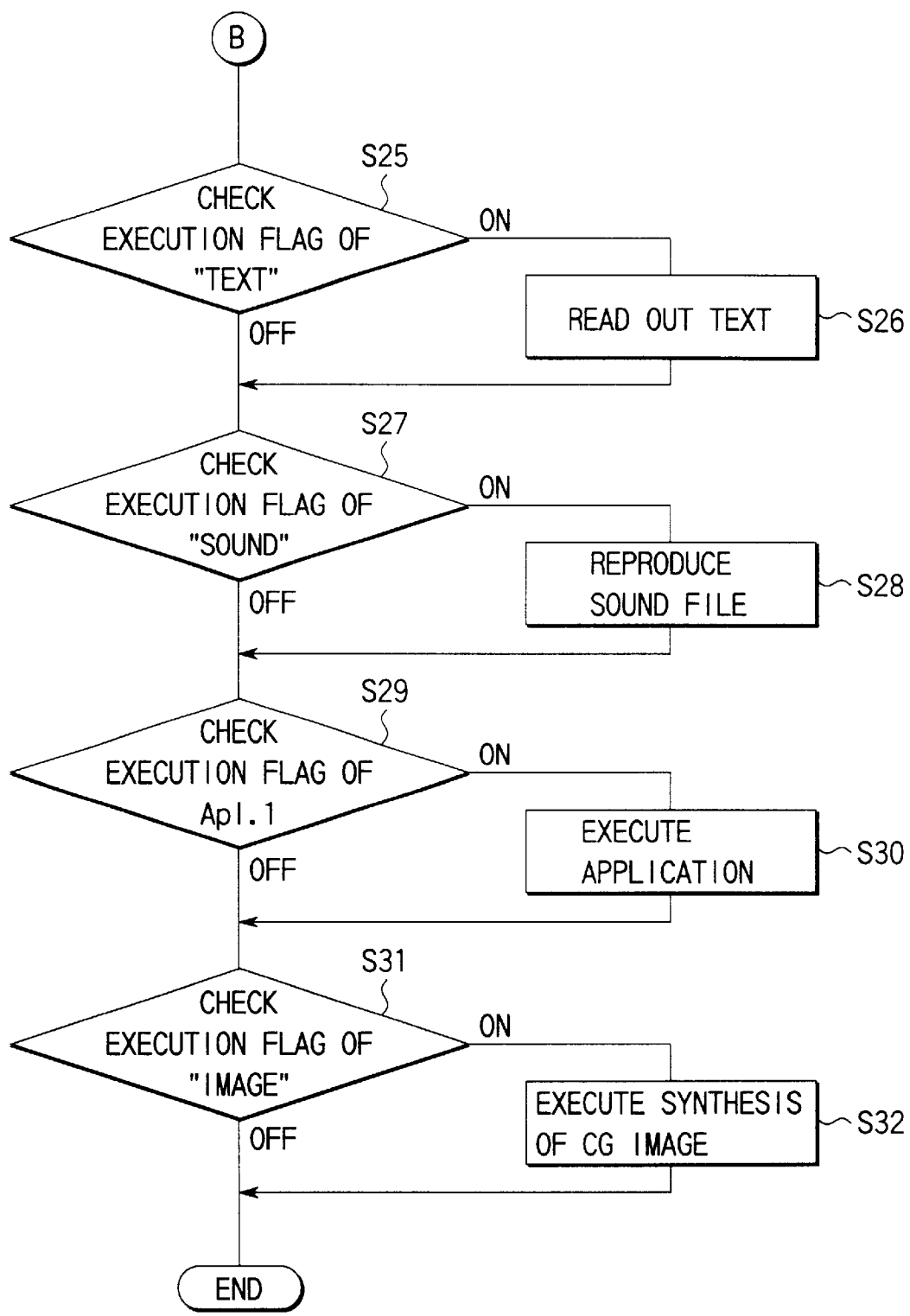
FIG. 16 is a flow chart illustrating a process procedure at the time of personal verification in this another embodiment.
Figure 17:
FIG. 17 shows an example of a synthesis image in this another embodiment.

8-61463 filed by the same application as the present application. This process function is illustrated in a functional block diagram of FIG. 2. In addition, in this embodiment, the personal verification process programs (PA) include a setting screen generation process routine for generating various setting screens as shown in FIGS. 5, 6 and 15, an operation process routine by coordinates designation of a pointing device on the screen, and a face image synthesis process routine in a case of selecting synthesis parts shown in FIG. 15.

On a system board of the computer, there are provided a CPU 11; a host-PCI bridge 12 for connecting a CPU bus 1 and a PCI bus 2; a main memory 13; a VGA controller 14; a PCI-ISA bridge (PCI/ISA BUS-Bridge) 15; a bus master IDE controller 16; a BIOS-ROM 18; a real time clock (RTC) 19; an embedded controller (EC) 20; a power supply controller (PSC) 21; a keyboard controller (KBC) 22; a USB controller 23; a sound controller 24; and an image interface (I/F) 25.

The CPU 11 executes operation controls and data processing for the entire system, on the basis of various control programs stored in the BIOS-ROM 18 and various programs loaded from the HDD 17 into the main memory 13. In this case, a face image is acquired by the image-pickup camera 37 provided on the computer main body, and thus personal verification processes as illustrated in FIGS. 2, 7, 8, 12 and 13 are executed according to the personal verification process programs (PA).

The host-PCI bridge 12 includes a circuit for controlling memories in the system and the entire I/O.

The main memory 13 is used as a main memory of the present system, i.e. a system memory. The main memory 13 stores, for example, an operating system, an application program to be processed, and user data prepared by the application program, as well as a set information file created by a remote control operation. The main memory 13 is realized by a semiconductor memory such as a DRAM.

Figure 4:
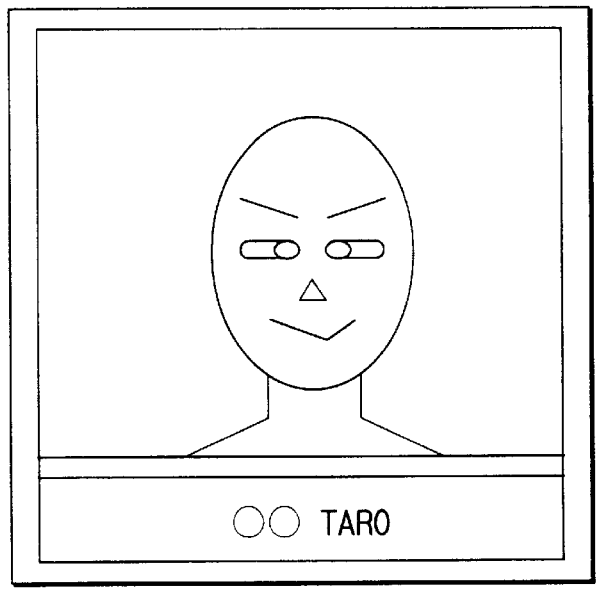
FIG. 4 is a view for illustrating an operation of the embodiment, showing an example of a display screen image structure of an image (a face image) taken in from an image-pickup camera.

The VGA controller 14 functions to control an LCD 32 used as a display monitor of the present system. The VGA controller 14 enables the LCD 32 in the LCD panel unit to display screen data stored in the VRAM 31. Under the control of the CPU 11 according to the personal verification process programs (PA), the LCD 32 is enabled to display, e.g. a face image as shown in FIG. 4, user-specific set screens as shown in FIGS. 5 and 6, and a synthesis part selection screen as shown in FIG. 15.

The PCI-ISA bridge 15 is a bus bridge for connecting the PCI bus 2 and an ISA bus 3. The bus master IDE controller 16 functions to control an IDE device (HDD 17 in this context) mounted on the computer main body. The bus master IDE controller 16 matches with a bus master function capable of executing DMA transfer between the IDE device and main memory 13. The BIOS-ROM 18 is a memory for storing a system BIOS and it is realized by a flash memory to effect rewrite of programs. The system BIOS is a system of function execution routines for accessing various hardware in the system. The system BIOS is so constructed as to be operated in a real mode. The system BIOS includes an IRT routine to be executed at the time of power-on of the system and BIOS drivers for controlling various hardware. Each BIOS driver includes a plurality of function execution routines corresponding to a plurality of functions for hardware control, in order to provide these functions to the operating system and application program. The RTC 19 is a clock module and includes a CMOS memory backed up by a battery for exclusive use. Various system configuration information including information for designating a power-up mode is set in this CMOS memory.

The EC 20 is a controller for controlling additional functions of the system. The EC 20 includes, e.g. a power supply sequence control function for controlling on/off switching of the system power supply in cooperation with the power supply controller 21, and a power supply status notice function. Communication between the EC 20 and the power supply controller 21 is performed via an I$^2$C bus. The power supply controller 21, which is connected to the EC 20 via the I$^2$C bus, controls a battery 26 and an external power supply 27. The keyboard controller 22 performs a key input control of the keyboard (KB) 33. The USB controller 23 performs a connection control for external devices which are connected to a USB port 34 and a remote-control port 35. The sound controller 24, which is connected to the ISA bus 3, performs a sound control, for example, for sound output to a speaker, headphone, etc. and sound input from a microphone.

The image interface 25 is provided between the PCI bus 2 and a camera connector 36. The camera connector 36 serves as an interface with the image-pickup camera 37 for imaging the face of the operator (user). The camera 37 is provided on a hinge box of the computer main body, at which the LCD panel unit is rotatably supported.

Figure 2:
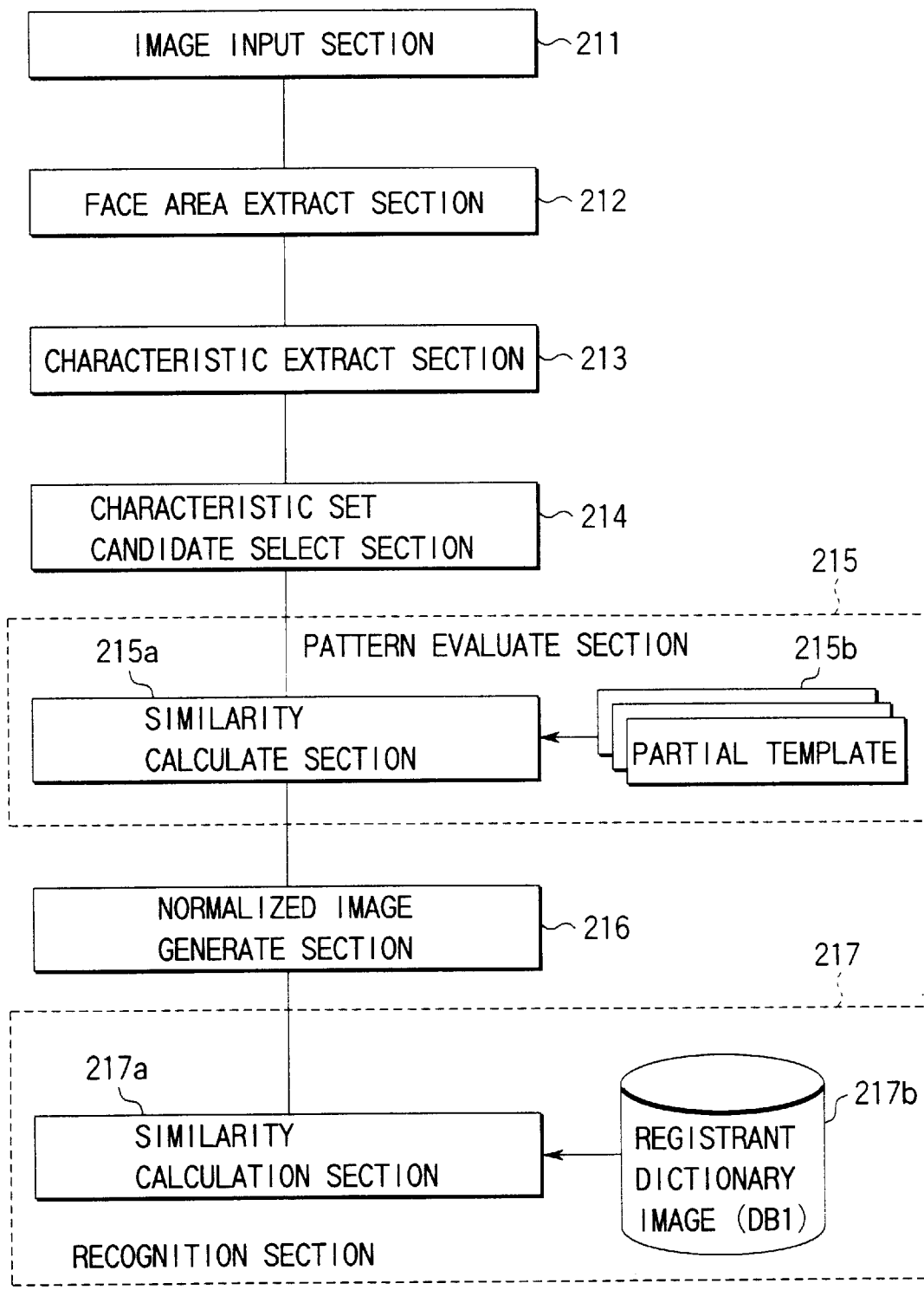
FIG. 2 is a functional block diagram showing a personal verification process function using extraction of facial features, according to the above embodiment, which is realized by executing a personal verification process program (PA)
Figure 3:
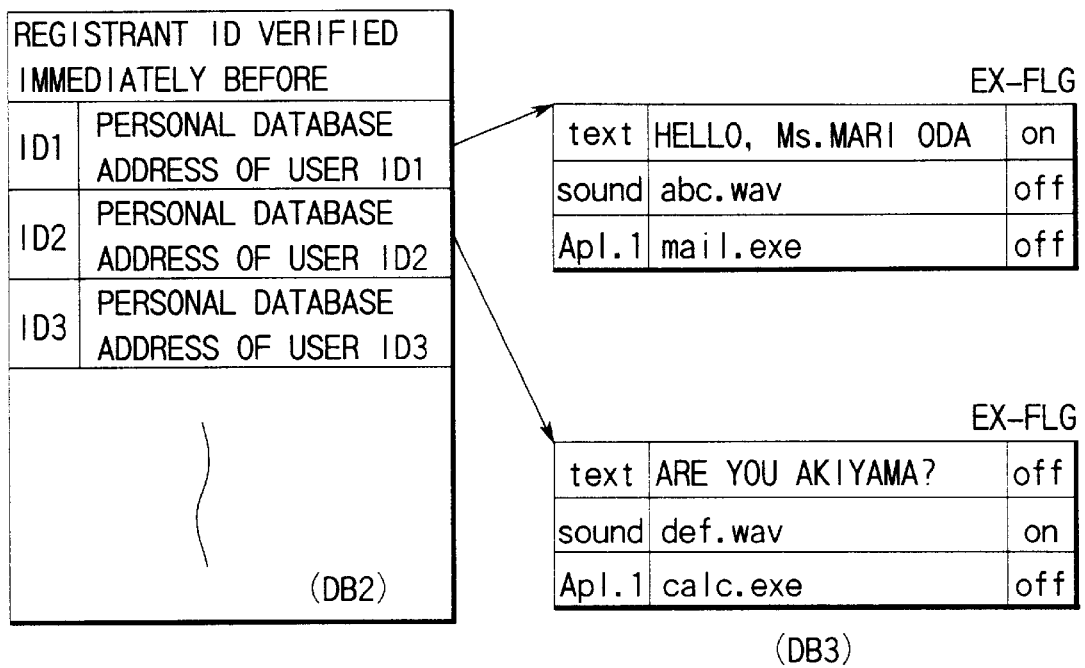
FIG. 3 shows an example of a structure of a database used in the above embodiment.

FIG. 2 is a functional block diagram illustrating a personal verification process function by means of extraction of facial characteristics. This function is realized by causing the CPU 11 to execute the personal verification process program (PA) loaded on the main memory 13. In this embodiment, as described above, characteristics of the eyes, nose, etc. are stably extracted from an input image (an image acquired by the image-pickup camera 37) to verify the user. In this context, the functional structural section shown in FIG. 2 is referred to as "recognition process section."

The process in the "recognition process section" is executed in step S2 in the process procedure illustrated in FIG. 7. A face area extract section 212 extracts a face area of the user from the image (acquired by the image-pickup camera 37) input from an image input section 211. A characteristic extract section 213 extracts characteristic candidates of the face from the face area using a separation degree filter. A characteristic set candidate select section 214 selects a characteristic set candidate using facial structural restrictions. A pattern evaluate section 215 calculates similarity between the selected characteristic set candidate and pre-registered partial templates of an eye area, a nose area, etc. The pattern evaluate section 215 thus finds a degree of conformity of a weighted sum and determines the characteristic set with a highest degree of conformity to be a correct combination of characteristics. Based on this characteristic set, a normalized image generate section 216 generates a normalized image. A recognition section 217 calculates a degree of similarity between the normalized image and pre-registered dictionary images of registrants, and determines the person represented by the dictionary image with a highest degree of similarity to be the user. In this case, the registrant dictionary images to be referred to are stored in the HDD 17 as a dictionary image file (DB1) and managed under the control of the CPU 11.

FIG. 3 shows an example of the structure of a database applied to the present invention. The database applied to this invention comprises a registrant management database (DB2) and a personal database (DB3).

The registrant management database (DB2) manages registrant Ids and personal database addresses of the registrants.

In addition, the registrant management database (DB2) manages a registrant ID of a registrant who was verified immediately before.

The personal database (DB3) manages a message (text) to be read out when personal verification has been effected, a sound file (sound) to be sent out when personal verification has been effected, and an application (apl.) to be activated when personal verification has been effected. Furthermore, the personal database (DB3) includes execution flags (EX-FLG) for controlling whether managed contents should actually be executed when personal verification has been effected.

FIGS. 4 to 6 are views for describing the operation of the above embodiment, which show examples of display screen structures. FIG. 4 shows an example of a display screen structure of an image (face image) acquired by the image-pickup camera 37. FIGS. 5 and 6 show examples of screen structures for setting processes when personal verification has been effected. In the examples shown in FIGS. 5 and 6, when the user has been recognized, the user is notified by means of sound or an application is activated. The present invention, however, is not limited to these examples. For instance, where the user has been recognized, login to a network may be effected. An example of the application is a screen saver.

Figure 8:
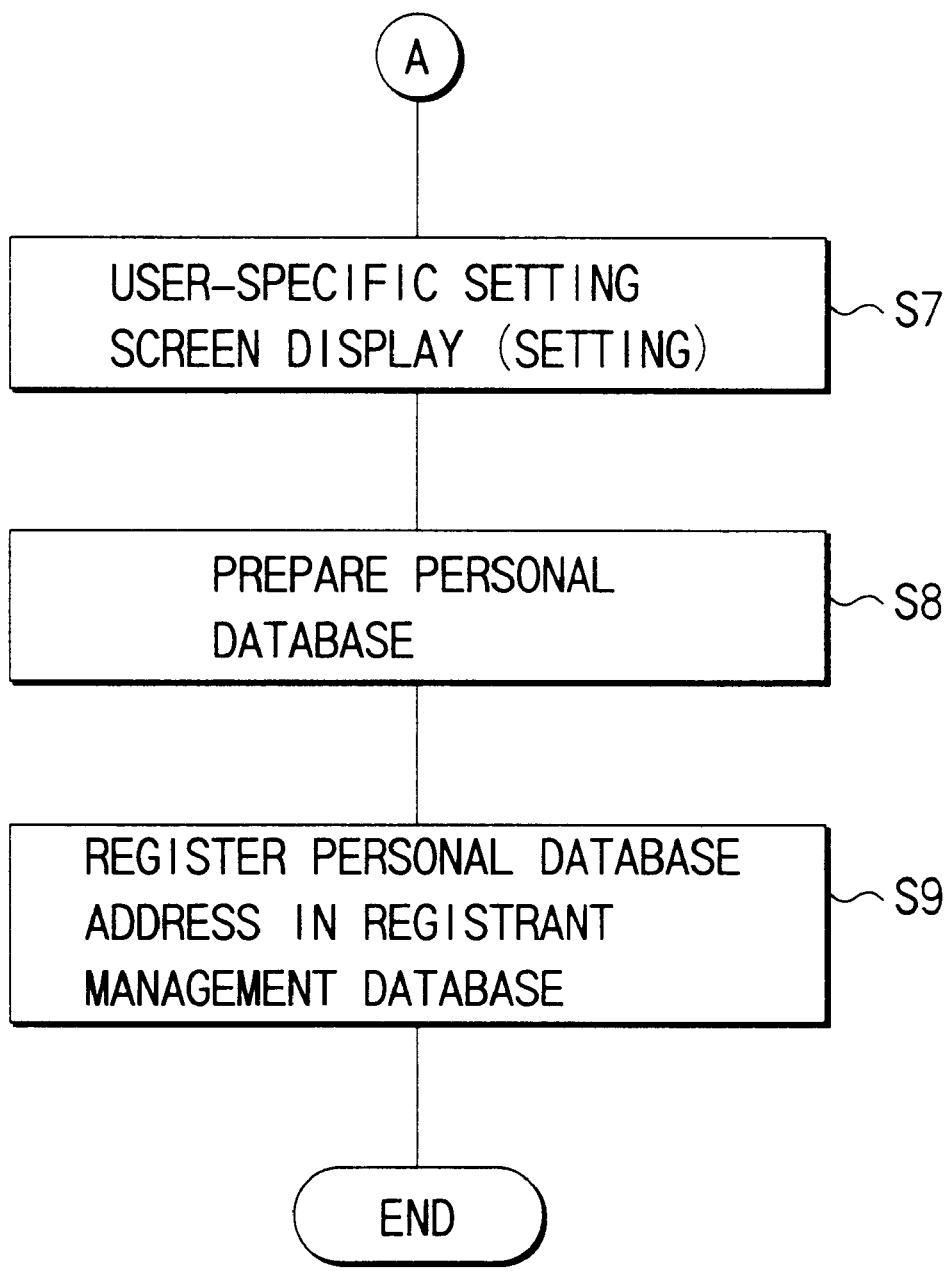
FIG. 8 is a flow chart illustrating a personal verification process procedure according to the personal verification process program (PA) in the above embodiment.

FIGS. 7 and 8 are flow charts illustrating a personal verification process procedure according to the personal verification process program (PA) in the embodiment of the invention.

FIGS. 9 to 11 show examples of the states in the registrant management database (DB2) and personal database (DB3), which will be referred to in the description of the operation of the personal verification process.

Figure 12:
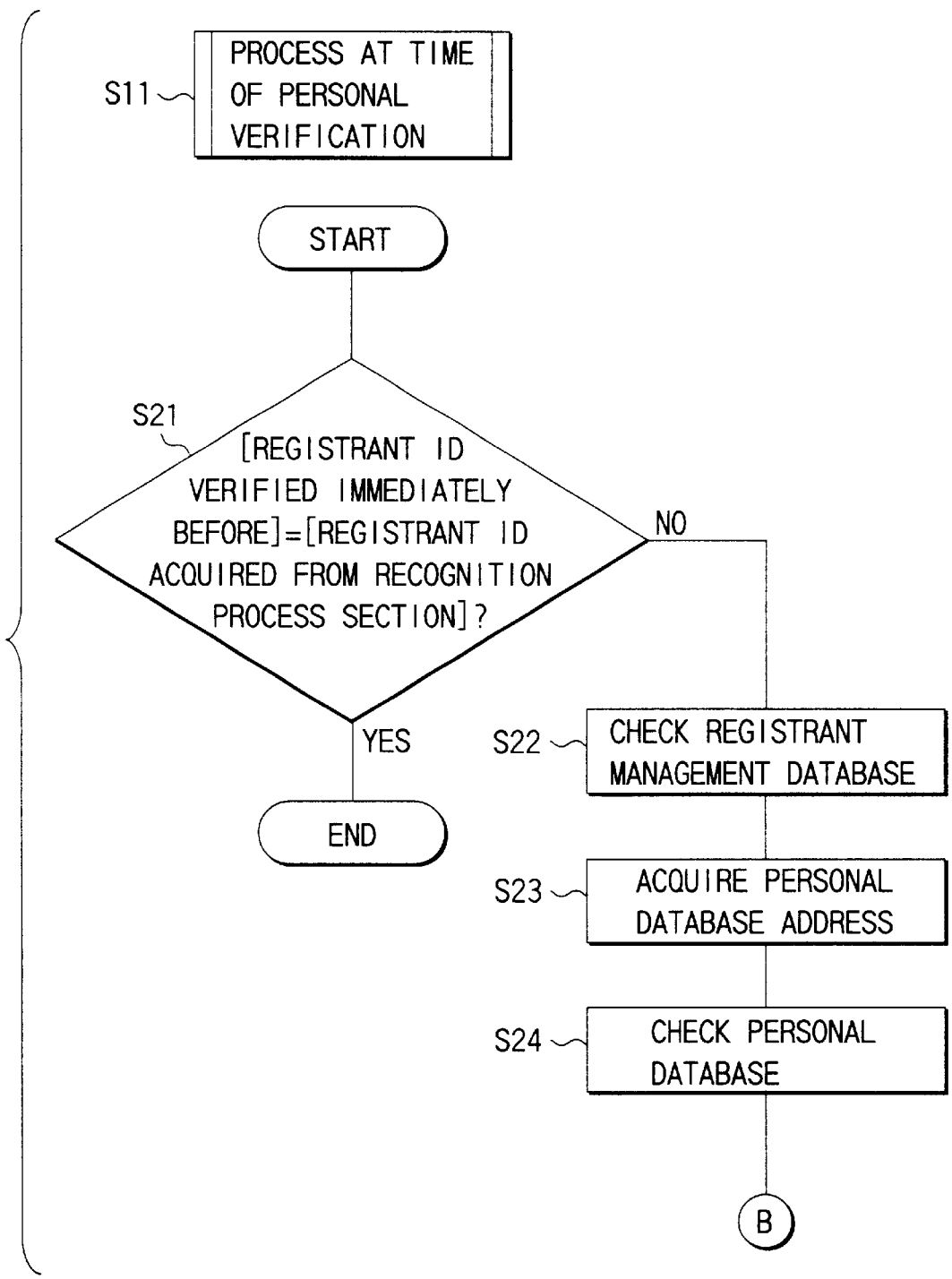
FIG. 12 is a flow chart showing a process procedure at the time of personal verification in the above embodiment.
Figure 13:
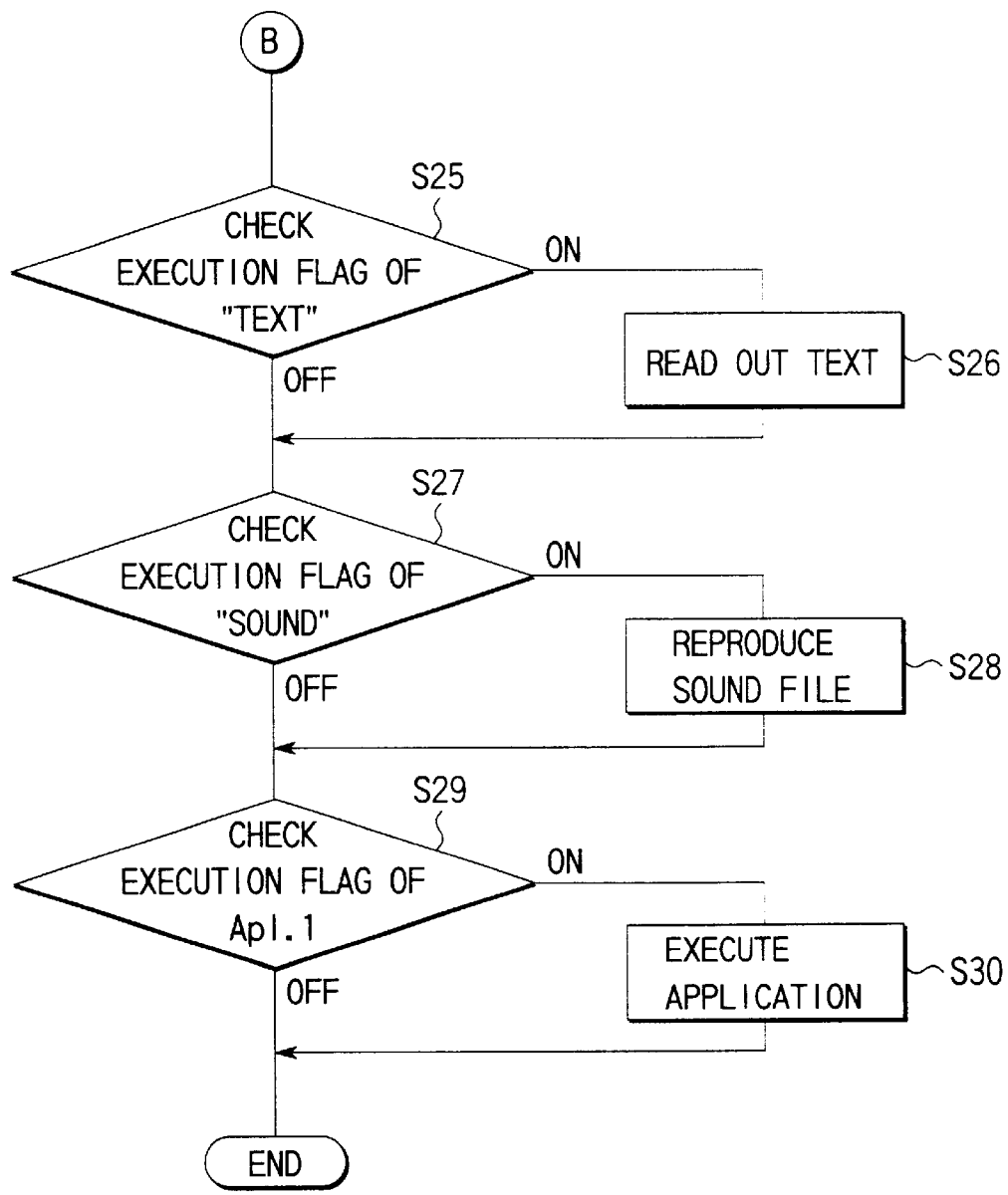
FIG. 13 is a flow chart showing a process procedure at the time of personal verification in the above embodiment.

FIGS. 12 and 13 are flow charts illustrating a process procedure at the time of personal verification, which is executed in step S11 in the flow chart of FIG. 7.

The operation in the embodiment of the present invention will now be described with reference to the above-mentioned figures.

When the operator (user) is in such a position that he/she is able to operate the computer, that is, when the user faces the display screen of the LCD 32 provided on the LCD panel unit, an image of the face of the user is acquired by the image-pickup camera 37 (step S1 in FIG. 7). The face image of the user acquired by the image-pickup camera 37 is displayed on the LCD 32 provided on the LCD panel unit (step S10 in FIG. 7) and also delivered to the recognition process section (shown in FIG. 2) as an object of the personal verification process (step S2 in FIG. 7).

In the recognition process section shown in FIG. 2, the face image acquired by the image-pickup camera 37 is compared with face images registered in the dictionary image file (DB1) with respect to facial characteristics. It is thereby determined whether the user, whose face image has been acquired by the image-pickup camera 37, is the registered user who is registered in advance in the dictionary image file (DB1).

In the verification process in the recognition process section shown in FIG. 2, if it has been determined that the face image acquired by the image-pickup camera 37 is that of the registered user, the associated registrant ID for personal identification is acquired. This registrant ID is delivered to a process routine ("user-specific process section") for performing preparation of a database relating to a process to be executed when personal verification has been effected and for performing the process to be executed when personal verification has been effected. Thus, control is shifted to the user-specific process section. On the other hand, if it has been determined that the face image acquired by the image-pickup camera 37 is not that of the registered user, a notice to this effect is issued to the user-specific process section (step S3 in FIG. 7).

In the user-specific process section, it is determined whether or not there is a registrant ID for personal identification (step S4 in FIG. 7). If there is no registrant ID, the process is completed. If there is the registrant ID in step S4, it is determined by the user's operation whether a menu of [User Setting] is selected (step S5 in FIG. 7). If the menu of [User Setting] is not selected, control is shifted to the process executed when personal verification is effected (step S11 in FIG. 7).

Where the menu of [User Setting] is selected, control is shifted to the process routine for preparation of the database relating to the process executed when personal verification is effected (step S6 in FIG. 7; steps S7–S9 in FIG. 8).

In step S6, the registrant ID acquired in the recognition process section (see step S2 and FIG. 2) is registered in the registrant management database (DB2) shown in FIG. 3 (see "ID4" in FIG. 9).

In step S7, the [User-Specific Setting Screen] as shown in FIG. 5 or 6 is displayed on the LCD 32 provided on the LCD panel unit (the screen of FIG. 5 and that of FIG. 6 being switchable by a tab).

On the screen shown in FIG. 5 or 6, the user can set a process (e.g. reading out of a message, reproduction of a sound file, activation of an application) which is to be executed when the presence of the user himself/herself has been recognized (verified). For example, when an item, [READ OUT A TEXT], in FIG. 5 is selected, a given text an be set. When an item, [SEND OUT A SOUND (*.WAV)], is selected, a given sound file can be set. In an item, [APPLICATION], the user can set a desired application.

If in step S7 the user sets on the screen of FIG. 5 or 6 the process which is to be executed when the presence of the user is recognized (verified) by the computer system, a personal database is created in step S8.

In step S8, the personal database (DB3) shown in FIG. 3 is prepared on the basis of the information set by the user in step S7. On the screens of FIGS. 5 and 6, for example, the item [READ OUT A TEXT] alone is set. Accordingly, a database as shown in FIG. 10 is prepared in step S8.

Subsequent to the completion of preparation of the personal database in step S8, an address of the personal database prepared in step S8 is registered in step S9 in the registrant management database (DB2), as shown in FIG. 10, thereby linking the address of the personal database to the registrant ID registered in step S6.

The process (step S11 in FIG. 7) to be executed when personal verification has been effected, where the menu of [User Setting] is not selected, will now be described with reference to flow charts of FIGS. 12 and 13 and the database structure shown in FIG. 11.

FIGS. 12 and 13 are flow charts illustrating the process procedure relating to the notice or the activation of the application which is carried out at the time the personal verification has been effected, using the result obtained in the recognition process section of FIG. 2 by the means for comparing the eye and nose patterns and verifying the user.

Where the menu of [User Setting] is not selected in step S5 in FIG. 7, the registrant ID obtained from the recognition process section shown in FIG. 2 is compared with the registrant ID verified immediately before the registration in the registrant management database (DB2) shown in FIG. 11 (step S21 in FIG. 12).

Where the registrant ID obtained from the recognition process section shown in FIG. 2 coincides with the registrant ID verified immediately before the registration in the registrant management database (DB2) shown in FIG. 11, this means that the notice or the activation of the application at the time of personal verification was carried out immediately before. Thus, in this case, the process is completed.

In the comparison of registrant IDs (step S21 in FIG. 12), if the registrant ID obtained from the recognition process section shown in FIG. 2 is different from the registrant ID verified immediately before the registration in the registrant management database (DB2) shown in FIG. 11, this means that the user verified differs from the registrant verified immediately before. Thus, a process for the notice or the activation of the application, which begins with step S22, is carried out.

At first, the registrant management database (DB2) shown in FIG. 11 is checked to find the registrant ID identical to the registrant ID obtained from the recognition process section shown in FIG. 2 (step S22 in FIG. 12). On the basis of the found registrant ID, the address of the corresponding personal database (DB3) is acquired (step S23 in FIG. 12). On the basis of the acquired address of the personal database, the personal database (DDB3) is retrieved (step S24 in FIG. 12).

As regards the retrieved personal database (DB3), the execution flag of "text" is checked (step S25 in FIG. 13). If the flag is "on", the desired text (set on the screen of FIG. 5 or 6 in step S7 in FIG. 8) registered in the personal database (DB3) is read out using a speech synthesis system comprising a sound controller 24, etc. (step S26 in FIG. 13). If the execution flag of "text" is "off" in step S25, the execution flag of "sound" in the personal database (DB3) is checked (step S27 in FIG. 13). If the execution flag is "on", the desired sound file (set on the screen of FIG. 5 or 6 in step S7 in FIG. 8) registered in the personal database (DB3) is reproduced (step S28 in FIG. 13). If the execution flag of "sound" is "off" in step S27, the execution flag of "Apl." in the personal database (DB3) is checked (step S29 in FIG. 13). If the execution flag of "Apl." is "on", the desired application (set on the screen of FIG. 6 in step S7 in FIG. 8) registered in the personal database (DB3) is executed (step S30 in FIG. 13) and the process is completed.

As has been described above, the personal verification is effected using the face image acquired by the image-pickup camera 37, and through the verification process procedure the function of automatically starting a predetermined application or an individually set program is realized. Thus, the system with a high security function and high operability is provided.

Another embodiment of the present invention will now be described with reference to FIGS. 14 to 17.

In the above described embodiment, the processes executed when the personal verification is effected are the reading out of a desired message, the reproduction of a desired sound file and the activation of a desired application. On the other hand, in the present embodiment, an additional process is provided which is to be executed when the personal verification is effected.

The addition of a process to be executed when the personal verification is effected will now be described by referring to an example in which a CG (computer graphics) image prepared in advance is synthesized with an input image and a synthesis image is displayed. As is shown in FIG. 14, the personal database (DB3) is additionally provided with an area ("image area") for storing information on the name of the CG image, and an execution flag (EX-FLG). Moreover, as is shown in FIG. 15, a synthesis parts select screen for setting a CG image, which is to be synthesized when the presence of the user is recognized (verified) by the computer system, is added. A process for registering the information set by the user on the select screen of FIG. 15 on the personal database (DB3) shown in FIG. 14 is added to step S8 in FIG. 8. Furthermore, as illustrated in steps S31 and S32 in FIG. 16, a new process is added wherein the execution flag of "image" in the personal database (DB3) is checked and, if this flag is "on", the CG image is synthesized with the image acquired by the image-pickup camera 37 on the basis of the data name of the CG image registered in the personal database (DB3) and the synthesis image is displayed (see FIG. 17).

With this image synthesis process function, where personal verification is effected, not only a message is displayed on the screen but also a given image specific to the user can be displayed. Thus, the process function relating to the personal verification can be extended.

As has been described above, according to the present embodiment of the invention, as regards the function of setting the process executed at the time of personal verification, a given process can be set while personal verification is performed using the result obtained by the method of verifying the user on the basis of comparison of the eye and nose patterns etc. Accordingly, even where many users are registered, the user in front of the camera can be verified and the process for the user can be set. Therefore, the user is not required to set the process by finding his/her own information, and the operability is greatly enhanced.

Furthermore, as regards the function of setting the process to be executed at the time of personal verification, a function is provided for managing the database for an individual user and managing information specific to the user. Accordingly, in the process executed when personal verification is effected, the user-specific process can be carried out. Therefore, even if the user changes, there is no need to alter the setting, and the operability can be remarkably enhanced.

Besides, when personal verification is effected using the result obtained by the method of verifying the user on the basis of comparison of the eye and nose patterns, etc, this fact can be indicated by a given sound message. Thus, not only a message can be displayed on the screen at the time of personal verification but also notification can be made by a message specific to the user. Thus, the user can be exactly notified of the verification result.

With the provision of the means for notifying the user by a given sound at the time of personal verification using the result obtained by the method of verifying the user on the basis of comparison of the eye and nose patterns, not only a message can be displayed on the screen at the time of personal verification but also notification can be made by a message specific to the user. Thus, the user can be exactly notified of the verification result.

With the provision of the function of activating a given process at the time of personal verification using the result obtained by the method of verifying the user on the basis of comparison of the eye and nose patterns, an application specific to the user can be automatically activated at the time of personal verification. In the case of, e.g. a usually activated application, there is no need to perform an activation operation therefor, and the operability can be greatly enhanced.

With the provision of the function of synthesizing an input image with a CG (computer graphics) image prepared in advance and displaying a synthesis image at the time of personal verification using the result obtained by the method of verifying the user on the basis of comparison of the eye and nose patterns, not only a message can be displayed on the screen at the time of personal verification but also notification can be made by a message specific to the user. Thus, the user can be exactly notified of the verification result.

The above-described methods in the embodiments, that is, the personal verification processes illustrated in FIGS. 2, 7, 8, 12, 13 and 16 can be stored as computer-executable programs in a distributable fashion in external storage media such as a memory card (ROM card, RAM card, etc.), a magnetic disk (floppy disk, hard disk, etc.), an optical disk (CD-ROM, DVD, etc.) and a semiconductor memory. The computer reads the program stored in the external storage medium by means of a storage medium reader (HDD 17 in the embodiment) such as a magnetic disk drive. The operation of the computer is controlled by the read program, whereby the personal verification process functions according to the above-described embodiments can be realized.

According to the present invention, the personal verification is performed using the face image acquired by the image-pickup camera, and a predetermined application program or a user-specific program is automatically activated. This invention therefore provides a personal verification method for a computer system, a computer system having an image-pickup camera, and a readable recording medium applied to the computer system, whereby a high security function and high operability can be achieved.

Furthermore, according to present invention, a function for automatically setting up the predetermined application program or a program individually set, so that personal verification method in the computer system, computer system with image pick-up camera and recording medium used in the computer system which have high security function and good operability can be provided by means of the personal verification based on a face image acquired by the image-pick up camera.

Moreover, according to the present invention, information definitions on applications to be executed through the personal verification procedure can be preset or managed for individual users. Therefore, where many users are registered, a user in front of the camera can be verified and a process for the user can be set. Accordingly, the user is not required to find and set his/her own information, and the operability is greatly enhanced. Moreover, since notification of a personal verification result can be made by means of a given text, sound message or sound, not only a message can be displayed on the screen at the time of personal verification but also notification can be made by a message specific to the user. Thus, the user can be exactly notified of the verification result. Besides, since a given application can be activated when personal verification is effected, even if the user changes, there is no need to alter the setting and the operability can be remarkably enhanced. Furthermore, since a given computer-graphics image prepared in advance can be synthesized with an input image and a synthesis image displayed, not only a message can be displayed on the screen at the time of personal verification but also notification can be made by a message specific to the user. Thus, the user can be exactly notified of the verification result.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of verification for a computer system, the method comprising the steps of:

acquiring a face image of a user at a time of a user operation;

verifying whether the acquired face image coincides with any one of pre-registered face images;

determining whether identification information corresponding to the acquired face image coincides with identification information, which is obtained immediately before the identification information corresponding to the acquired face image where the acquired face image coincides with the any one of the pre-registered face images; and executing a preset process where the identification information corresponding to the acquired face image does not coincide with the identification information, which is obtained immediately before the identification information corresponding to the acquired face image.

2. A method of verification according to claim 1, wherein said pre-registered face images correspond to program names of programs to be executed, and where the verifying step verifies that the acquired face image coincides with one of said pre-registered face images, the executing step executes one of said programs according to the program name corresponding to said verified one of the pre-registered face images.

3. A method of verification according to claim 1, wherein said acquiring step acquires the face image of the user by means of a camera which is built in the computer system or a camera which is externally attached to the computer system.

4. A method of verification according to claim 1, wherein said pre-registered face images correspond to personal files including program names of programs to be executed, and where the verifying step verifies that said acquired face image coincides with one of said pre-registered face images, the executing step executes a process according to a content of one of said personal files which corresponds to said verified one of the pre-registered face images.

5. A method of verification according to claim 1, further comprising the steps of:

storing identification information for a user who is authorized to use the computer system in a management data base;

creating a personal data base in which processes which are to be executed and flags, respectively provided corresponding to the processes which are to be executed, for indicating that corresponding process is active or not are stored; and setting an address of the personal data base in the management data base such that the address of the personal data base is associated with the identification information.

6. A method of verification according to claim 5, wherein the executing step includes:

obtaining the address of the personal data base which is set in the management data base, the address of the personal data base being associated with the any one of the identification information, where the identification information corresponding to the acquired face image does not coincide with identification information which is obtained immediately before the identification information corresponding to the acquired face image, retrieving the personal data base which is indicated by the obtained address of the personal data base set in the management data base to obtain the process which is to be executed, and executing the obtained process which is to be executed, the obtained process being associated with the flags which indicate that corresponding process is active.

7. A computer system comprising:

means for acquiring a face image of a user;

means for processing verification of the user by extracting features of the acquired face image;

means for determining whether identification information corresponding to the acquired face image coincides with identification information which is obtained immediately before the identification information corresponding to the acquired face image where the verification of the user is confirmed; and means for executing a preset process where the identification information corresponding to the acquired face image does not coincide with the identification information which is obtained immediately before the identification information corresponding to the acquired face image.

8. A computer system according to claim 7, wherein said processing means checks the verification of the user by verifying whether the feature of the acquired face image coincides with any one of pre-registered features of face images, said pre-registered features of face images correspond to program names of programs to be executed, respectively, and where the verification of the user is confirmed by said processing means, said execution means executes the program according to the program name corresponding to said verified pre-registered face image.

9. A computer system according to claim 7, wherein the face image acquired by means of a camera which is built in said computer system or is externally attached to said computer system.

10. A computer system according to claim 7, further comprising a data base for storing pre-registered features of face images associated with personal files including program names of programs to be executed, wherein said processing means checks the verification of the user by verifying whether said acquired face image coincides with any one of the pre-registered features of face images stored in the data base, and where said processing means verifies that said acquired face image coincides with any one of the pre-registered features of face images, said execution means executes a process stored in a personal file corresponding to said one of the pre-registered features of face images.

11. A computer system according to claim 10, wherein each of said personal files includes at least one of a text message and a sound message.

12. A computer system according to claim 10, further comprising means for storing address of the personal file which is associated with any one of the pre-registered features of face images, wherein the executing means executes the process stored in the personal file by referring to the address of the personal file stored in the storing means.

13. A computer system according to claim 12, wherein the personal file stores flag indicating whether or not the process stored therein is active or not, and the executing means only executes the process being associated with the flag which indicates that corresponding process is active.

14. A computer system according to claim 7, further comprising:

means for presenting a selection screen of image components to be synthesized into the acquired face image; and means for synthesizing one of the image components selected from the selection screen into the acquired face image.

15. A computer system comprising:

means for acquiring a face image of a user;

means for processing verification of the user by extracting features of the acquired face image;

means for executing a preset process where the verification of the user is confirmed by the process means;

means for determining whether or not the acquired current face image coincides with a previous face image obtained immediately before the acquired face image; and means for preventing execution of the preset process when the acquired face image coincides with the previous face image.

16. A computer system according to claim 15, wherein the determining means determines whether identification information corresponding to the acquired current face image coincides with identification information corresponding to the acquired previous face image obtained immediately before the acquired current face image.

17. A computer system according to claim 16, wherein the executing means executes the preset process where the identification information corresponding to the acquired current face image does not coincide with the identification information corresponding to the acquired previous face image obtained immediately before the acquired current face image.

18. A computer system according to claim 15, wherein the processing means checks the verification of the user by verifying whether the feature of the acquired face image coincides with any one of pre-registered features of face images, said pre-registered features of face images correspond to program names of programs to be executed, respectively, and wherein the verification of the user is confirmed by said processing means, said execution means executes the program according to the program name corresponding to said verified pre-registered face image.

19. A computer system according to claim 15, further comprising a data base for storing pre-registered features of face images associated with personal files including program names of programs to be executed, wherein said processing means checks the verification of the user by verifying whether said acquired face image coincides with any one of the pre-registered features of face images stored in the data base, and wherein said processing means verifies that said acquired face image coincides with any one of the pre-registered features of face images, said execution means executes a process stored in a personal file corresponding to said one of the pre-registered features of face images.

20. A computer system according to claim 19, further comprising:

means for presenting a selection screen of image components to be synthesized into the acquired face image; and means for synthesizing one of the image components selected from the selection screen into the acquired face image.

21. A computer system according to claim 19, further comprising means for storing address of the personal file which is associated with any one of the pre-registered features of face images, wherein the executing means executes the process stored in the personal file by referring to the address of the personal file stored in the storing means.

22. A computer system according to claim 21, wherein the personal file stores a flag indicating whether or not the process stored therein is active, and the executing means only executes the process being associated with the flag which indicates that corresponding process is active.

\* \* \* \* \*